(12) United States Patent
Holder et al.

(10) Patent No.: US 6,622,665 B2
(45) Date of Patent: Sep. 23, 2003

(54) FUEL FRACTIONATION DEVICE

(75) Inventors: Eberhard Holder, Kusterdungen (DE);
Roland Kemmler, Stuttgart (DE);
Martin Matt, Bruchsal (DE); Viktor Pfeiffer, Ostfildern (DE); Carsten Plog, Markdorf (DE); Thomas Stengel, Friedrichshafen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/016,820

(22) Filed: Dec. 13, 2001

(65) Prior Publication Data
US 2002/0062794 A1 May 30, 2002

Related U.S. Application Data

(63) Continuation-in-part of application No. PCT/EP00/03893, filed on Apr. 29, 2000.

(30) Foreign Application Priority Data

Jun. 15, 1999 (DE) .......................................... 199 27 177

(51) Int. Cl.$^7$ ............................................... F02B 43/08
(52) U.S. Cl. ........................................................ 123/3
(58) Field of Search .............................. 123/3, 525, 576, 123/557, 558, 575

(56) References Cited

U.S. PATENT DOCUMENTS

| | | | | |
|---|---|---|---|---|
| 3,794,000 A | * | 2/1974 | Hodgkinson | 123/557 |
| 3,906,915 A | * | 9/1975 | Bednarczyk et al. | 123/575 |
| 3,985,108 A | * | 10/1976 | Matsumoto et al. | 123/3 |
| 4,257,366 A | | 3/1981 | Strem et al. | |
| 4,429,675 A | * | 2/1984 | Talbert | 123/558 |
| 5,996,562 A | * | 12/1999 | Plog et al. | 123/576 |

FOREIGN PATENT DOCUMENTS

| | | |
|---|---|---|
| DE | 31 40 119 | 4/1983 |
| DE | 197 13 841 | 11/1998 |

* cited by examiner

Primary Examiner—Henry C. Yuen
Assistant Examiner—Hyder Ali
(74) Attorney, Agent, or Firm—Klaus J. Bach

(57) ABSTRACT

In a fuel fractionation device for separating a low-boiling fuel fraction from a liquid fuel of an internal-combustion engine, including a vessel which contains the liquid fuel, and in which a reduced pressure is generated by withdrawing the low-boiling fuel fraction in vapor form from the vessel and making it available to the internal combustion engine, the efficiency of the fractionation is improved by utilizing a carrier-gas which is introduced into the liquid fuel, and which is withdrawn from the vessel together with the fuel fraction vapor.

13 Claims, 2 Drawing Sheets

FUEL FRACTIONATION DEVICE

This is a continuation-in-part application of international application PCT/EP00/03893 filed Apr. 29, 2000 and claiming the priority of German application 199 271 77.1 filed Jun. 15, 1999.

BACKGROUND OF THE INVENTION

The invention relates to a fuel fractionation device for separating a low-boiling fuel fraction from a liquid fuel of an internal-combustion engine in a container, in which a low pressure is generated for evaporating the low boiling fuel fraction.

The fuels which are currently available for the operation of internal-combustion engines, for example for motor vehicles such as trucks, passenger cars, buses, represent a compromise between, firstly, restrictions on the part of fuel producers, e.g. on account of different crude oil qualities, production methods, costs and energy expenses, and, secondly, in some cases contradictory demands imposed by the internal-combustion engines, such as for example a reliable cold start even at extremely low temperatures, low exhaust and evaporation emissions, low fuel consumption, good antiknock properties even for turbocharged engines, prevention of deposits, avoidance of corrosion, low sulfur content, quiet engine running and high reliability. To enable existing fuels to be better adapted to the requirements of the internal-combustion engines, fuel fractionation devices of the type described above are used.

DE 197 13 841 C1 has disclosed a fuel fractionation device of this type in which in a fuel vessel, which may be formed either by a fuel tank of a motor vehicle or by an intermediate vessel, a reduced pressure is generated as a result of gas being sucked out. In the known device, this reduced pressure is selected in such a way that the components of the low-boiling fuel fraction, which are to be separated from the liquid fuel contained in the fuel vessel, evaporate out of this fuel. In this case, the extraction of gas or the generation of the reduced pressure is achieved by means of a gas pump. Moreover, with this extraction of gas also the low-boiling fuel fraction in vapor form which is formed in the vessel is withdrawn from the vessel. On the delivery side of the gas pump, the evaporated components are condensed, in order to be able to provide the low-boiling fuel fraction, which has been separated, to the internal-combustion engine in a liquid state. To improve the performance of the fuel fractionation device, in particular the fractionation rate, the suction side of the gas pump can be heated and/or the pressure side of the pump can be cooled.

The present invention deals with the problem of improving the performance of a fuel fractionation device of the type described in the introduction. It is a particular object to increase the fractionation rate.

SUMMARY OF THE INVENTION

In a fuel fractionation device for separating a low-boiling fuel fraction from a liquid fuel of an internal combustion engine, including a vessel which contains the liquid fuel, and in which a reduced pressure is generated by withdrawing the low-boiling fuel fraction in vapor form from the vessel and making it available to the internal combustion engine, the efficiency of the fractionation is improved by utilizing a carrier-gas which is introduced into the liquid fuel, and which is withdrawn from the vessel together with the fuel fraction vapor.

The carrier gas rises through the fuel in the form of bubbles and, in the process, is preferentially enriched with the low-boiling fuel components. The mixture collects above the fuel level in the vessel, from where the carrier gas/fuel fraction mixture formed in this way can be moved out of the vessel. Unlike in the prior art, the reduced pressure, which is in this case generated in the vessel by the gas being sucked out, only has to ensure that the gaseous carrier gas/fuel fraction mixture formed in the vessel is sucked out of the vessel. The pressure reduction required to achieve this is considerably lower than the pressure reduction required to evaporate the components of the low-boiling fuel fraction out of the liquid fuel. The pressure source, which is used to generate the reduced pressure and also the vessel construction, can in this way be simplified.

Preferably, however, the reduced pressure, which is generated in the vessel as a result of the gas being sucked out, is large enough to suck in the carrier gas, so that there is no need for an additional pump. By way of example, the suction requirements are low enough so that they can be satisfied by the vacuum generated in the air intake of the internal-combustion engine. In the process, at least some of the air required for combustion in the internal-combustion engine is sucked in through the vessel. In this case, the carrier gas used is ambient air.

According to a particularly advantageous embodiment using air as carrier gas, the air/fuel fraction mixture extracted from the vessel can be fed to the internal-combustion engine directly as a combustible air/fuel mixture, since the air, which is enriched with the low-boiling fuel fraction, forms an ignitable gas mixture.

Alternatively, the gas may also be sucked out by means of a special gas pump, so that it is also possible to compress the carrier gas/fuel fraction mixture on the delivery side of the gas pump.

Instead of an open circuit, in which the air used as carrier gas is fed to the internal combustion engine for combustion together with the fuel fraction which has been separated off in the form of an air/fuel fraction mixture, in which case the carrier gas is consumed, it is also possible to form a closed circuit, in which, after the carrier gas/fuel fraction mixture has been sucked out, the fuel fraction is separated from the carrier gas and is used again. In this case, the fuel fraction, which is separated out of the mixture is held ready in a special reservoir, preferably collected in the liquid state, and is fed into the internal-combustion engine when required. The carrier gas may either be introduced back into the fuel in the vessel or, in particular if air is used as carrier gas, can be discharged the environment.

In accordance with a particularly advantageous embodiment of the fuel fractionation device according to the invention, the vessel into which the carrier gas is introduced and from which the carrier gas/fuel fraction mixture is sucked out may be formed by a fuel tank in which the fuel for the internal-combustion engine is stored. In the case of a vehicle, this is the vehicle's fuel tank for supplying fuel to the internal-combustion engine may be employed for that purpose.

The invention will become more readily apparent from the following description of a preferred embodiment on the basis of the accompanying drawings.

DESCRIPTION OF PREFERRED EMBODIMENTS

Figure 1:
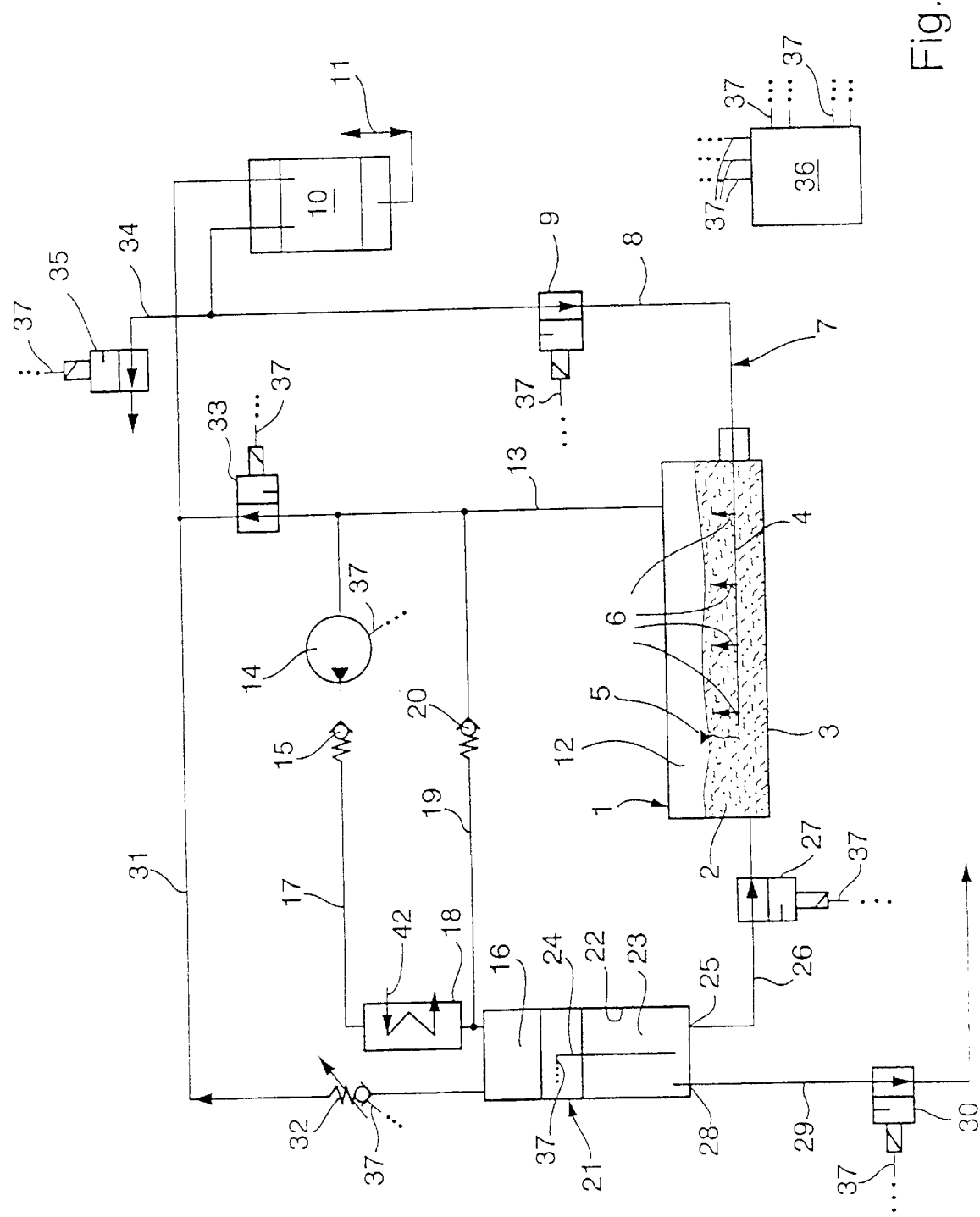
FIG. 1 shows a circuit diagram of a fuel fractionation device according to the invention.

In accordance with FIG. 1, a fuel fractionation device according to the invention comprises a vessel 1, which contains fuel 2, for example diesel fuel or gasoline, and is preferably formed by a fuel tank of an internal-combustion engine (not shown). If the fuel fractionation device is installed on board a motor vehicle, the vessel 1 is preferably formed by the vehicle's fuel tank, which stores the fuel for the internal-combustion engine of the vehicle. It is also possible for the vessel 1 to be formed by a container, which is separate from the fuel tank of the internal-combustion engine, and to be supplied with fuel 2 from the fuel tank.

The fuel fractionation device according to the invention is equipped with a carrier-gas supply 7 including a gas distributor 4, which is arranged in the interior of the vessel or fuel tank 1, in the vicinity of a base 3 of the fuel tank 1, or is integrated in this base 3. The gas distributor 4 is arranged sufficiently low in the fuel tank 1 for it to be submerged in the fuel 2 at the levels which customarily occur that is below a fuel level 5. The gas distributor 4, which can also be referred to as a swirler, is internally hollow and has a plurality of gas outlet openings 6.

The gas outlet openings 6 form the exit side of the gas distributor 4, which on its entry side is connected to a gas feed line 8, in which a valve 9 is arranged. The gas feed line 8 is in communication, via an activated carbon filter 10, at 11 with a carrier-gas reservoir or with a carrier-gas source, which is preferably formed by the environment. In that case, the carrier gas is formed by ambient air. Above the fuel level 5, the fuel tank 1 contains a gas-collection space 12, to which a suction line 13 is connected.

The fuel fractionation device according to the invention also has a gas pump 14, which has a suction side connected to the suction line 13 and a supply side, by a pressure line 17, via a non-return valve 15 to a separator 16. The separator 16 separates the carrier gas and the fuel fraction and may, for example, be equipped with a cyclone and/or include a selective membrane.

In the pressure line 17 there is a heat exchanger 18 through which a heat-transfer medium can flow, as symbolically indicated by an arrow 42. Between separator 16 and heat exchanger 18, a pressure-relief line 19 is connected to the pressure line 17, and this line 19 is connected to the suction line 13 via a pressure-relief valve 20.

The separator 16 is arranged in a housing 21 which, in its interior, also includes a reservoir 22 for a low-boiling fuel fraction 23 which has been separated out of the fuel 3. In addition, a level sensor 24, which monitors the level of the fuel fraction 23, is arranged in the reservoir 22. The reservoir 22 is connected to the tank 1 by means of a first connection 25, via a fuel return line 26 in which a valve 27 is arranged. By means of a second connection 28 the fuel fraction 23 stored in the reservoir 22 is supplied to the internal-combustion engine via a fuel feed line 29 in which a valve 30 is arranged. By way of example, the fuel fraction 23 is fed to a fuel manifold of a fuel injection device or is fed directly to an injection valve of this fuel injection device.

By means of a gas return line 31, in which an adjustable pressure control valve 32 is arranged, the separator 16 is in communication with the environment 11 via the activated carbon filter 10. The suction line 13 can be connected to the gas return line 31 via a valve 33. An air intake line 34, in which a valve 35 may be arranged and which is connected to an air intake (not shown) of the internal-combustion engine, is in communication with the gas feed line 8.

To actuate and control the electrical components, there is a control unit 36, which is connected to the corresponding components via signal and control lines 37. The signal and control lines 37 are only slightly indicated for the sake of clarity.

The fuel fractionation device shown in FIG. 1 operates as follows:

At the beginning of a cold start of the internal-combustion engine, for example as a result of a starter motor being actuated, the gas pump 14 is activated and the valve 9 is opened, while the valve 33 is closed. This position of the valves leads to a reduced pressure being generated in the fuel vessel 1 via the suction line 13, and this reduced pressure spreads to the carrier-gas feed 7, so that air can be sucked out of the environment 11 through the activated carbon filter 10. In the gas distributor 4, this air passes through its outlet openings 6, distributed as finely as possible, into the fuel 2, where it rises through the fuel 2 and is preferentially enriched with low-boiling fuel components before collecting in the gas collection space 12 of the vessel 1. On account of the gas being sucked out through the suction line 13, the air/fuel fraction mixture formed in this way is sucked out of the gas collection space 12 by the gas pump 14 and is fed to the separator 16 via the pressure line 17. In the heat exchanger 18, the compressed air/fuel fraction mixture is cooled with the result that the fuel fraction is liquefied. According to a particular embodiment, the fuel 2 of the fuel tank 1 can be used as cooling medium, whereby the fuel is heated, which enhances the fractionation of the fuel 2. The heat exchanger 18 may also be acted on by ambient air or may be connected to a cooling circuit which is already present on the vehicle, for example to the cooling circuit of an air-conditioning system or to an engine cooling circuit.

In the separator 16, the liquid fuel fraction is separated from the air. While the fuel fraction 23 enters the reservoir 22, where it collects, the air is returned to the activated carbon filter 10 through the gas return line 21.

During a cold start, the fuel fraction 23, which serves as starting fuel, is supplied to the internal-combustion engine. The pressure control valve 32 is set to the required injection pressure by the control unit 36. Since the separator 16 and the reservoir 22 are accommodated in the common housing 21, which is designed as a pressure vessel, the pressure which is set at the pressure control valve 32 automatically also prevails in the fuel fraction 23.

Before the valve 30 is opened in order to feed the fuel fraction 23 to the internal-combustion engine, the valve 27 is opened briefly in order to return any water of condensation which may have collected in the reservoir 22 to the fuel tank 1 from the reservoir 22.

When the cold start or a warm-up phase of the internal-combustion engine has ended, the valve 30 closes. The fuel fractionation may be continued in order, for example, to top up the supply of low-boiling fuel fraction 23 in the reservoir 22. During this fractionation, the compression pressure is regulated at the pressure control valve 32, for example as a function of the ambient temperature. The compression pressure on the delivery side of the pump 14 is selected in such a way that the partial pressure of the fuel components which remain in the carrier gas is as low as possible after the separation and downstream of the pressure control valve 32, i.e. the compression pressure is set in such a way that particularly effective condensation and separation can be carried out.

Downstream of the separator 16, the carrier gas is fed to the activated carbon filter 10, from where it can be introduced back into the carrier-gas feed 7. In the embodiment shown in FIG. 1 a closed circuit is formed for the carrier gas, since the carrier gas, after the fuel fraction has been separated out of it, is available without having been consumed and, in particular, is used a number of times.

Depending on the state of charge of the activated carbon filter 10, it is either regenerated or charged. This procedure enables the regeneration of the charged activated carbon filter 10 to take place independently of operation of the internal-combustion engine. Moreover, all the low-boiling components available in the fuel are available for cold starts of the internal-combustion engine, since during the intake of air for blowing the air into the fuel as carrier gas, the activated carbon filter 10 is regenerated. During fractionation operation, the loading of the activated carbon filter 10 can take place by means of a residual proportion of fuel components in the returned quantity of carrier gas. When the fractionation has ended, the valve 33 is opened, so that the loading of the activated carbon filter 10 takes place via the evaporation emissions of the fuel 2 from the fuel tank 1.

When there is no fractionation in progress, the activated carbon filter 10 can also be regenerated by briefly opening the valve 35, so that the internal-combustion engine sucks in at least some of its intake air through the activated carbon filter 10.

To end the fractionation, the gas pump 14 is switched off, the valve 9 is closed and the valve 33 is opened.

Figure 2:
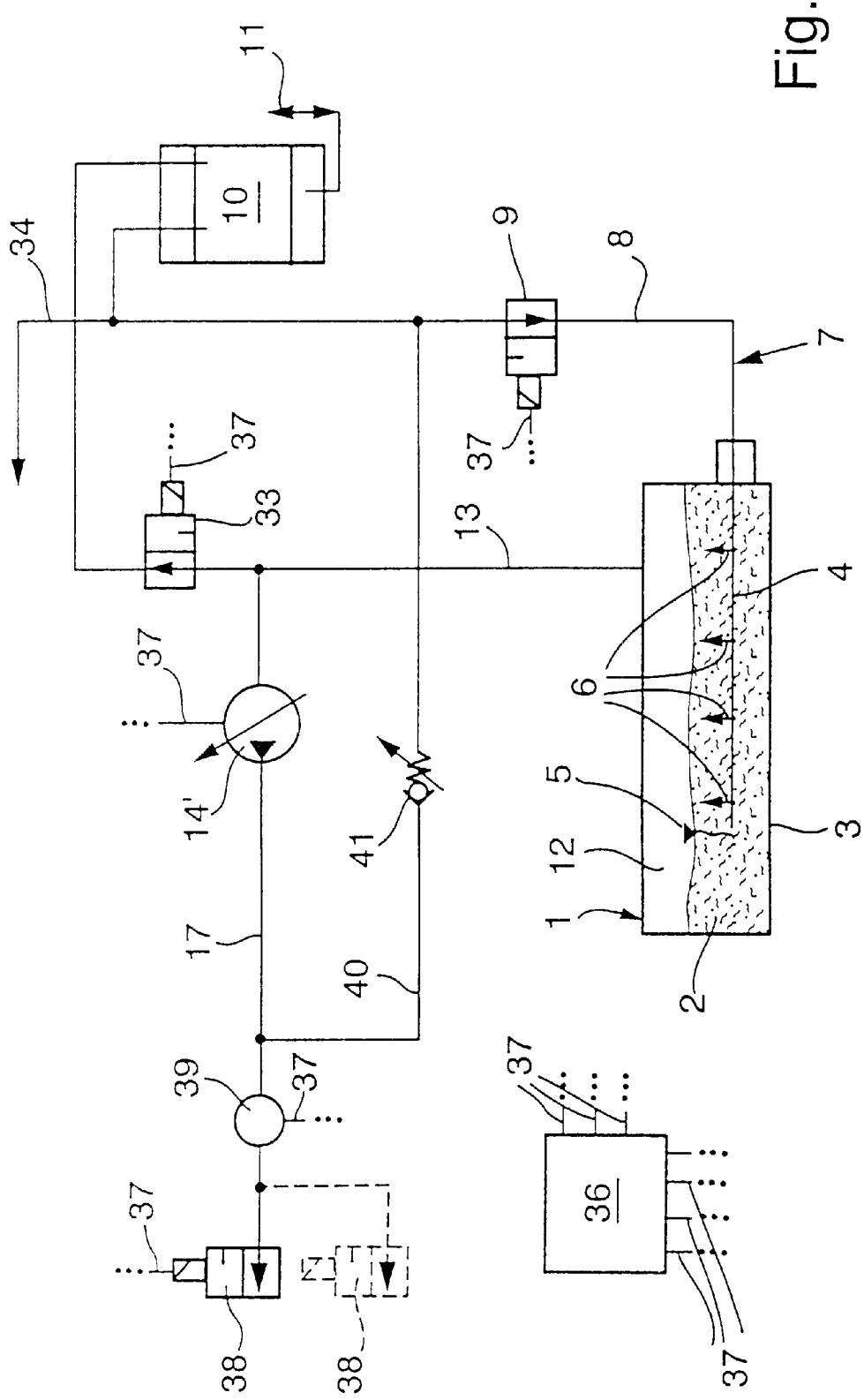
FIG. 2 shows a fuel fractionation device according to the invention with a similar circuit.

FIG. 2 shows another embodiment of the fuel fractionation device according to the invention, in which identical components are denoted by identical reference numerals.

In accordance with FIG. 2, in this variant there is a controllable gas pump 14' in order to suck out the gas in order to generate a reduced pressure in the vessel 1. On its delivery side, this gas pump 14' is connected to at least one injection valve 38, by means of which the air/fuel fraction mixture which has been sucked out of the gas collection space 12 of the vessel 1 is supplied to the internal-combustion engine or individual combustion chambers or induction regions of these fuel chambers. A fuel sensor 39, which senses the content or concentration of the fuel fraction in the air/fuel fraction mixture and transmits a correlated signal value to the control unit 36 via a corresponding line 37, is arranged in the pressure line 17. The delivery side of the gas pump 14' is in communication, via a return line 40 which is connected to the pressure line 17 and in which an adjustable pressure control valve 41 is arranged, with the gas feed line 8 upstream of the valve 9, so that the delivery side of the gas pump 14' is connected to the environment 11 via the activated carbon filter 10.

At the beginning of a cold start and a warm-up phase of the internal-combustion engine, the gas pump 14' is switched on, the valve 33 is closed and the valve 9 is opened. As a result, a reduced pressure is formed on the suction side of the gas pump 14' and spreads via the suction line 13 into the gas collection space 12 of the vessel 1. Moreover, the reduced pressure causes air to be sucked in from the environment 11 through the activated carbon filter 10 and through the carrier-gas feed 7 into the fuel 2. The carrier gas or air, which has been sucked in, is discharged in finely distributed form into the fuel 2 in the gas distributor 4 and removes the low-boiling components from the fuel 2. The air/fuel fraction mixture, which collects in the gas collection space 12, is conveyed via the suction line 13 to the delivery side of the gas pump 14'. The suction capacity or the delivery capacity of the gas pump 14' is regulated as a function of the engine speed, the engine load and as a function of the fuel concentration measured at the sensor 39. The pressure at which the air/fuel fraction mixture is available at the valves 38 of the internal-combustion engine is set at the pressure control valve 41. This pressure regulation takes place as a function of the ambient temperature in order, for example, to prevent condensation of fuel in the pressure line 17. Air/fuel fraction mixture which is not used flows across the pressure control valve 41 and is introduced into the gas feed line 8, where, when the fractionation is active, it is once again introduced into the fuel 2 through the gas distributor 4.

The valves 38 are controlled as a function of the engine speed, the engine load, the fuel concentration in the air/fuel fraction mixture and the pressure set on the delivery side of the gas pump 14'.

After the cold start or the warm-up phase has ended, the gas pump 14' is switched off, the valve 9 is closed and the valve 33 is opened. When the fractionation is inactive, the activated carbon filter 10 takes up the evaporation emissions of the fuel 2 in the tank 1. The activated carbon filter 10 can be regenerated in the customary way via the air intake line 34 as a result of the induction operation of the internal-combustion engine. Preferably, however, regeneration takes place during fractionation operation, in which the ambient air is sucked through the activated carbon filter 10 with a corresponding regeneration action.

The embodiment of the fuel fractionation device which is illustrated in FIG. 2 and forms part of a fuel supply installation of the internal-combustion engine, unlike the embodiment illustrated in FIG. 1 takes place without a reservoir for the low-boiling fuel fraction. By means of the carrier-gas feed 7 which is proposed in accordance with the invention, it is possible for an ignitable air/fuel fraction mixture, which is particularly suitable for starting and warming up an internal-combustion engine to be produced in sufficient quantities in an "on-line" fashion.

Since in this embodiment the air used as carrier gas is consumed, so that new air has to be constantly sucked in from the environment 11 for fractionation, the circuit is in this case open.

What is claimed is:

1. A fuel fractionation device for separating a low-boiling fuel fraction from a liquid fuel of an internal combustion engine, comprising a vessel which contains the liquid fuel, a gas extraction means generating a reduced pressure in said vessel by withdrawing gas and the low-boiling fuel fraction formed by the fuel fractionation device in the vessel from the vessel and making it available to the internal combustion engine, and a carrier gas supply means including a gas distributor arranged submerged in the fuel in the vessel for introducing a carrier gas into the liquid fuel in said vessel thereby enhancing removal of the low boiling fuel from the liquid fuel in sad vessel by said carrier gas as it rises through the fuel, said carrier gas being sucked out of said vessel together with the fuel fraction evaporated from he fuel in the vessel.

2. A fuel fractionation device according to claim 1, wherein the carrier gas is air.

3. Fuel fractionation device according to claim 1, wherein the gas distributor has gas outlet openings which a low a finely distributed discharge of gas from the gas distributor into the fuel.

4. A fuel fractionation device according to claim 1, wherein the reduced pressure generated in the vessel as a result of the gas being sucked out is used to operate the carrier-gas supply means.

5. A fuel fractionation device according to claim 1, including a gas pump for withdrawing the gas from said vessel.

6. A fuel fractionation device according to claim 1, wherein the gas is withdrawn from said vessel by the vacuum generate by the internal combustion engine in an intake duct of the internal combustion engine.

7. A fuel fractionation device according to claim 1, wherein said vessel is formed by a fuel tank of the internal-combustion engine.

8. A fuel fractionation device according to claim 1, wherein a fuel fraction sensor, which determines the quantity of fuel fraction being transported, is arranged in the flow path of the carrier gas/fuel fraction mixture, which is withdrawn from the vessel.

9. A fuel fractionation device according to claim 1, wherein, with air being used as a carrier gas, the air/fuel fraction mixture sucked out of the vessel is fed to the internal combustion engine as a combustible mixture.

10. A fuel fractionation device according to claim 9, wherein a controllable gas pump is used to withdraw the mixture from said vessel.

11. A fuel fractionation device according to claim 1, wherein the carrier gas/fuel fraction mixture, which is withdrawn from said vessel, is fed to a separator, which separates the carrier gas front the fuel fraction, the fuel fraction being retained in a reservoir.

12. A fuel fractionation device according to claim 11, wherein a heat exchanger for cooling the carrier gas/fuel fraction mixture is arranged upstream of said separator.

13. A fuel fractionation device according to claim 12, wherein said heat exchanger is cooled by the fuel in the vessel for heating the fuel in the vessel.

* * * * *